US010740336B2

(12) United States Patent
Venkata Naga Ravi

(10) Patent No.: US 10,740,336 B2
(45) Date of Patent: Aug. 11, 2020

(54) COMPUTERIZED METHODS AND SYSTEMS FOR GROUPING DATA USING DATA STREAMS

(71) Applicant: ORACLE INTERNATIONAL CORPORATION, Redwood Shores, CA (US)

(72) Inventor: Kiran Vedula Venkata Naga Ravi, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 325 days.

(21) Appl. No.: 15/716,895

(22) Filed: Sep. 27, 2017

(65) Prior Publication Data
US 2019/0095495 A1 Mar. 28, 2019

(51) Int. Cl.
*G06F 16/2455* (2019.01)
*G06Q 10/10* (2012.01)
*G06Q 10/06* (2012.01)

(52) U.S. Cl.
CPC ....... *G06F 16/24568* (2019.01); *G06Q 10/06* (2013.01); *G06Q 10/10* (2013.01)

(58) Field of Classification Search
CPC ... G06F 16/24568; G06Q 10/10; G06Q 10/06
See application file for complete search history.

(56) References Cited

U.S. PATENT DOCUMENTS

| | | | | |
|---|---|---|---|---|
| 7,523,137 | B2* | 4/2009 | Kass | G06Q 10/00 |
| 9,317,829 | B2* | 4/2016 | Anand | G06Q 10/0635 |
| 9,542,259 | B1* | 1/2017 | McEwen | G06F 11/0793 |
| 10,284,587 | B1* | 5/2019 | Schlatter | H04L 63/1433 |
| 2011/0246463 | A1* | 10/2011 | Carson, Jr. | G06F 16/35 |
| | | | | 707/737 |
| 2014/0039958 | A1* | 2/2014 | Bivens | G06Q 10/06 |
| | | | | 705/7.15 |
| 2014/0059395 | A1* | 2/2014 | Mahindru | G06F 11/07 |
| | | | | 714/48 |
| 2015/0379355 | A1* | 12/2015 | Kanga | G08B 13/19671 |
| | | | | 382/103 |
| 2017/0302505 | A1* | 10/2017 | Zafer | H04L 41/0631 |
| 2018/0285768 | A1* | 10/2018 | Karuppasamy | G06N 20/00 |
| 2018/0365417 | A1* | 12/2018 | Wu | G06N 20/00 |
| 2019/0124099 | A1* | 4/2019 | Matselyukh | H04L 41/142 |

* cited by examiner

*Primary Examiner* — Pierre M Vital
*Assistant Examiner* — Zuheir Mheir
(74) *Attorney, Agent, or Firm* — Kraguljac Law Group, LLC

(57) ABSTRACT

Systems, methods, and other embodiments associated with grouping data using data streams are described. In one embodiment, a method includes publishing data into a data stream. The example method may also include evaluates phrases within data in the data stream to identify a set of features having data divergence amongst the data above a divergence threshold. The example method may also include computing a model correlating data to the set of features. The example method may also include applying the model to data to compute feature vectors for the data. The example method may also include comparing the feature vectors to identify and group similar data.

19 Claims, 9 Drawing Sheets

COMPUTERIZED METHODS AND SYSTEMS FOR GROUPING DATA USING DATA STREAMS

BACKGROUND

Many businesses provide technical support to help resolve issues encountered by users, such as customers or employees. For example, a provider of a multi-tenant software platform may provide users with access to various business functionality, such as process and workflow tracking functionality, website creation and hosting functionality, application creation and execution functionality, etc. The provider may employ a case management system through which users of the multi-tenant software platform can submit incident reports of issues relating to the multi-tenant software platform.

The case management system is accessible to agents that can help provide solutions for resolving the incident reports. The case management system uses predefined products, categories, and groups to organize, route, and process incident reports. Because of the static nature of how the case management system organizes, routes, and processes incident reports, groups can run orthogonal to a root cause of an issue. Thus, there is a proliferation of incidents and duplicate effort by agents to resolve the same issue. For example, many incident reports may be related to the same root cause but get routed to different agents to process because the incident reports may not be categorized exactly the same. Thus, computing resources, time, and agent effort is wasted in the duplicate efforts to identify a solution for the same issue.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for grouping data using data streams. A case management system may be used by users to submit data such as incident reports and by agents to process and resolve such incident reports. Unfortunately, duplicate effort by multiple agents for resolving the same root cause of an issue can result, thus wasting significant computing resources and time. This duplicate effort can arise when incident reports for the same root cause are not submitted exactly the same due to different categories being selected by users, different language used to describe similar problems, new evolving issues not yet recognized and categorized, etc. For example, a new mobile operating system launch can have new issues never yet experienced, and thus there may be no adequate category for such issues.

As will be described herein, in one embodiment, automated incident report grouping that can dynamically adapt to what issues are currently being reported is disclosed. Features are extracted from incident reports. These features are used to group similar incident reports, thus resulting in a model that can be used to group subsequently received incident reports. The model can be periodically recomputed based upon recent incident reports in order to identify new feature for grouping incident reports, remove stale features, etc. For example, server lag issues for a disaster response organization may occur around the occurrence of a hurricane due to a large amount of submissions for help. However, once efforts to help with the disaster conclude, the server lag issues may no long occur or be relevant. In another example, a mandatory patch may be deployed to permanently solve an operating system crash, and thus users may no longer experience the crash. In this way, computing resources and time are not otherwise wasted from the duplicate effort by agents to resolve similar incident reports since such resolution efforts may substantially occur through computing devices.

Figure 1:
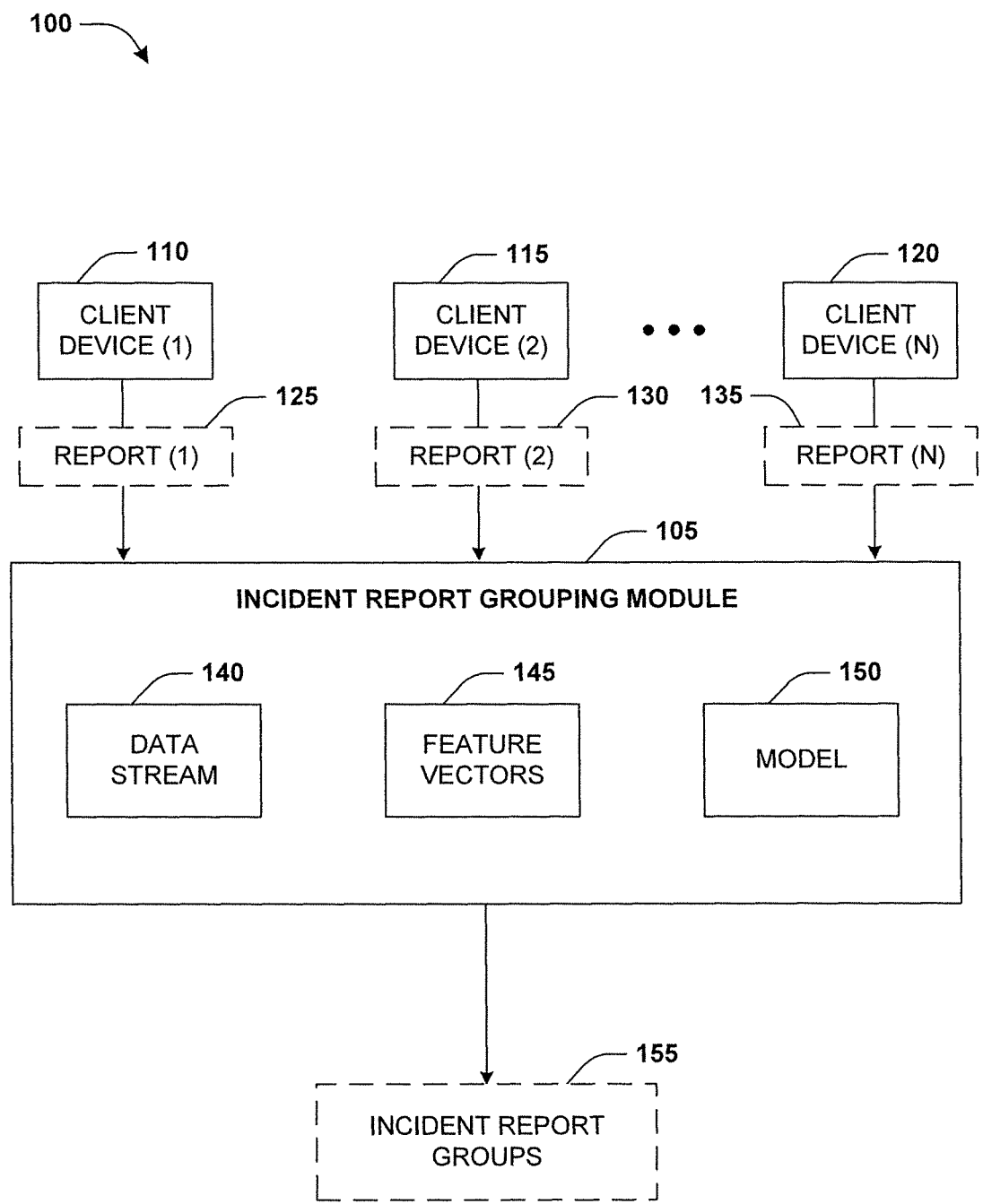
FIG. 1 illustrates an embodiment of a system associated with grouping similar incident reports.

With reference to FIG. 1, one embodiment of a computer system 100 associated with incident report grouping is illustrated. The computer system 100 includes an incident report grouping module 105, which can be configured to execute on a computer, such as computer 815 of FIG. 8. The incident report grouping module 105 is configured to receive, process, group, and assign incident reports received from users for routing to agents for further incident resolution. In one embodiment, the incident grouping model 105 is associated with a case management system associated with incident report management. The incident report grouping module 105 is used to group similar incident reports. Incident reports are similar if they relate to similar issues and/or circumstances relating to such issues. For example, incident reports relating to fast battery drain on the same model of phone would be similar, whereas incident reports of fast battery drain or connectivity loss on different models of phones running different operating systems may not be similar.

The incident report grouping module 105 is configured to receive incident reports from client devices, such as a first incident report 125 submitted by a first client device 110, a second incident report 130 submitted by a second client device 115, and/or other incident reports from other client devices such as an nth incident report 135 submitted by an nth client device 120. In one embodiment, the incident reports are received as emails, submissions through an application, submissions through a website, submission through a phone call, etc. The incident report grouping module 105 can receive the incident reports as network communications received over a network from the client devices.

The incident report grouping module 105 is configured to publish a plurality of incident reports received over the network from the client devices into a data stream 140. In one embodiment, the incident reports are published in a document format, such as in text, json, xml, etc., because the incident reports can be received in various formats that may be less conducive for feature extraction.

In one embodiment, the incident report grouping module 105 can optionally leverage static classification for high level grouping of incident reports that may be related or similar. The incident report grouping module 105 utilizes a static feature model to assign incident reports to static features. In one embodiment, the static feature model was trained based upon a static set of incident reports as opposed to dynamically trained and retrained as new incident reports are generated. Incident reports are sharded, such as distributed, into separate data streams. Incident reports with the same/similar static features are sharded into the same data stream.

The incident report grouping module 105 is configured to determine when a trigger has occurred for computing or recomputing a model 150 used to identify and group similar incident reports. In one embodiment, the trigger corresponds to a threshold number of incident reports being published into the data stream 140. In one embodiment, the trigger corresponds to a threshold amount of time occurring, such as incident reports received within a time slice window. In one embodiment, the trigger corresponds to the threshold number of incident reports being published into the data stream 140 over the time slice window.

Upon occurrence of the trigger, the incident report grouping module 105 is configured to evaluate phrases within the incident reports in the data stream 140 to identify a set of features. In one embodiment, a feature corresponds to a phrase having a divergence amongst the incident reports above a divergence threshold. A feature may be deemed a strong feature if it is unique to a subset of the incident reports that may be similar, and thus can be used to identify that subset of potentially similar incident reports. In one embodiment, a strong feature comprises the phrase "phone model (X) catches on fire" because only a subset of the incident reports comprise this phrase that is highly descriptive of an issue being reported in the incident reports. A weaker feature may be the phrase "battery" because "battery" occurs in so many incident reports that it does not help separate the incident reports into groups of similar incident reports. In one embodiment, feature scores are assigned to features based upon feature strength derived from amounts of divergence of such features. In one embodiment, feature scores can also relate to how frequently a phrase occurs within a single incident report. The more frequently the phrase occurs, the stronger the feature and the higher the feature score. It may be appreciated that a variety of factors may be considered when identifying and scoring features. In one embodiment, before identifying features, common phrases, punctuation, etc. are removed from the incident reports, such as periods, commas, the term "a", the term "and", etc. In one embodiment, features, such as topics, are derived from free form text using Principal Component Analysis (PCA), text feature extraction (TFIDF), support vector machine (SVM), inverted indices, etc.

The incident report grouping module 105 is configured to compute a model 150 correlating incident reports to the set of features. The model 150 is populated with entries that map feature names to incident reports having corresponding features. In one embodiment, the model 150 maps the feature names to pointers that reference incident report identifiers of corresponding incident reports. In this way, the model 150 can be used to identify similar incident reports based upon incident reports having similar or the same features, such as a number or percentage of features that are the same. In one embodiment, strong features may be given more weight for determining similarity than weak features, and thus feature scores can be used by the model 150.

In one embodiment, where the incident reports were sharded into multiple data streams, models can be computed for each data stream based upon features of incident reports within each data stream. In one embodiment, a first model is merged with a second model based upon an overlap of a first feature set of the first model and a second feature set of the second model.

The incident report grouping module 105 is configured to use the model 150 to group similar incident reports of the plurality of incident reports and/OR subsequently received incident reports. In one embodiment, the incident report grouping module 105 identifies feature vectors 145 of incident reports. In one embodiment, a feature vector may comprise bits representing features, where a bit can be set to a first value to indicate that an incident report has the feature or to a second value to indicate that the incident report does not have the feature. In another embodiment, a feature vector comprises the plurality of entries representing features and a value for each entry indicating a strength of which an incident report exhibits a feature such as how many times a phrase occurred compared to other phrases. The incident report grouping module 105 applies the model 150 to the feature vectors 145 to identify and group similar incident reports having similar or the same features. In one embodiment, an amount of similar values of bits within feature vectors is determined to group incident reports with similar features, such as where an incident report group of one or more incident reports is created based upon similar values of bits between the one or more incident reports being greater than a threshold.

In one embodiment, the model is used to compare feature vectors, such as by finding a cosine distance between features using a dot product of 2 feature vectors, to determine similarity between corresponding incident reports. A relatively smaller cosine distance is indicative of 2 incident reports being similar because values of entries within the feature vectors may be relatively similar. In one embodiment, similarity between incident reports is performed using an N×N computation or equivalent scheme, such as the cosine distance, a word2vec scheme, an SVM scheme, etc. to group incident reports into clusters ranked by a proximity score such as cosine distance. In one embodiment, the incident report grouping module 105 can evaluate proximity of a current feature vector of an incident report with values in the model 150 to return a list of incident reports that are similar to the incident report.

In one embodiment, the model 150 is applied to a first incident report and a second incident report to compute a first feature vector for the first incident report and a second feature vector for the second incident report. In one embodiment, features having feature scores above a threshold are used in the feature vectors so that merely strong features are used. For example, features with feature scores below 20% (e.g., a feature of "battery" having a low feature score due to low divergence amongst incident reports) are excluded from the feature vectors or in the comparison. The first feature vector and the second feature vector are compared, such as comparing values of bits, to determine a similarity between the first incident report and the second incident report. The first incident report and the second incident report are grouped together in response to the similarity exceeding a similarity threshold. In this way, the incident report grouping module 105 renders a user interface populated with the first incident report and an indication that the second incident report is similar to the first incident report. In one embodiment, the user interface is rendered through the case management system for display to an agent so that the agent can view details of similar incident reports.

Because issues and problems submitted through incident reports can change over time, features can become stale, new features can emerge, etc. In one embodiment, a lot of issues may be reported for a software bug that is later fixed by a mandatory update, and thus features of such issues will become stale. In another embodiment, a new issue may occur after the release of a new product, and thus features of the new issue would not be accounted for by a static model trained before the release. Accordingly, the model is periodically recomputed 150 with incident reports, such as current (e.g., recent) incident reports occurring over a subsequent time slice window. Phrases within the current incident reports in the data stream 140 are evaluated to identify a second set of features. The second set of features may have divergence amongst the current incident reports above the divergence threshold. The second set of features may comprise new features not included within the previous set of features used to compute the model 150, exclude stale features that were included in the previous set of features, etc. In this way, the model 150 is recomputed using the second set of features to create a recomputed model that can be applied to incident reports for grouping similar incident reports.

In one embodiment, a submission user interface is rendered through a computing device to a user for the creation and submission of incident reports through an incident report submission form. Input submitted through the incident report submission form (e.g., as the user types in real-time or after the user has completed entry within the incident report submission form) is evaluated to identify features of the input, such as a phrase "laptop model (Z)". The model 150 is utilized to evaluate the features to identify an incident report similar to the features. In this way, the submission user interface is populated with information regarding the incident report, such as while the user is still typing into the incident report submission form. This helps the user select a more accurate category/topic to associate with a current incident report being described within the incident report submission form. The information may comprise the category of the similar incident report, a prior solution provided for the similar incident report, etc. In one embodiment, personal information relating to a user that submitted the similar incident report is removed, such as a name, a description of a personal event leading to the issue, etc. In another embodiment, information about the user that is interacting with the incident report submission form is evaluated to identify personal information related to the user, such as demographic information, a mood of the user, an activity or task to be performed by the user, which may be obtained through email data, calendar data, social network post data, GPS data, etc. (e.g., a social network post may indicate that the user is planning a beach vacation, but has dropped their phone in a bathtub and is thus submitted an incident report on such). Content derived from the personal information, such as a water and sand resistant phone case that would be useful at the beach, is used to supplement the information.

In one embodiment, the prior solution may be executed/implemented/performed by the incident report grouping module 105, such as by a computing device hosting the incident report grouping module 105. The prior solution can be automatically implemented or implemented upon request by the user. In one embodiment, the computing device transmits network communications over a network to a user device to apply a software patch to the user device. In another embodiment, the computing device transmits network communications over the network to the user device to retrieve telemetry data from the user device, change a configuration parameter/setting of the user device, install an application on the user device, remove data from the user device, remove malware or a virus from the user device, etc. In this way, operation of the user device is changed, thus transforming the operation of the user device to implement the solution by the computing device.

In one embodiment, a configuration interface is rendered with a time slice interface used to adjust the time slice window used to trigger the identification of features and computation of the model. The configuration interface is rendered with an incident count interface used to adjust a threshold number of incident reports used to trigger the identification of features and computation of the model. The configuration interface is rendered with a feature count interface used to adjust a maximum number of features allowed within the set of features and/or feature vectors.

In one embodiment, a data stream is created from a plurality of communications received from one or more network channels, wherein the plurality of communications include incident reports. For a time slice window, a plurality of features are derived from the data stream from the incident reports by at least analyzing text from the incident reports. Identification data is identified from the plurality of incident reports from the data stream that include similar features within the incident reports. A display is controlled to display the identification data for the plurality of incident reports together as a group based on the similar feature associated with the plurality of incident reports.

In one embodiment, a data stream is created from a plurality of communications received from one or more network channels, wherein the plurality of communications include incident reports. For a time slice window, a plurality of features are derived from the data stream from the incident reports by at least analyzing text from the incident reports. Feature vectors are constructed for the plurality of incident reports by at least analyzing text from the plurality of incident reports to determine whether the text corresponds to features within the plurality of features. A feature vector of an incident report comprises a plurality of bits representing the plurality of features. A bit representing a feature is set to either a first value to indicate that the incident report has the feature or a second value to indicate that the incident report does not have the feature. Amounts of similar values of bits within feature vectors is determined to group incident reports that comprise similar features. A first incident report group of one or more similar incident reports is created based upon similar values of bits between the one or more similar incident reports being greater than a threshold. A display is controlled to render a user interface defining the first incident report group on the display of a computing device.

Figure 2:
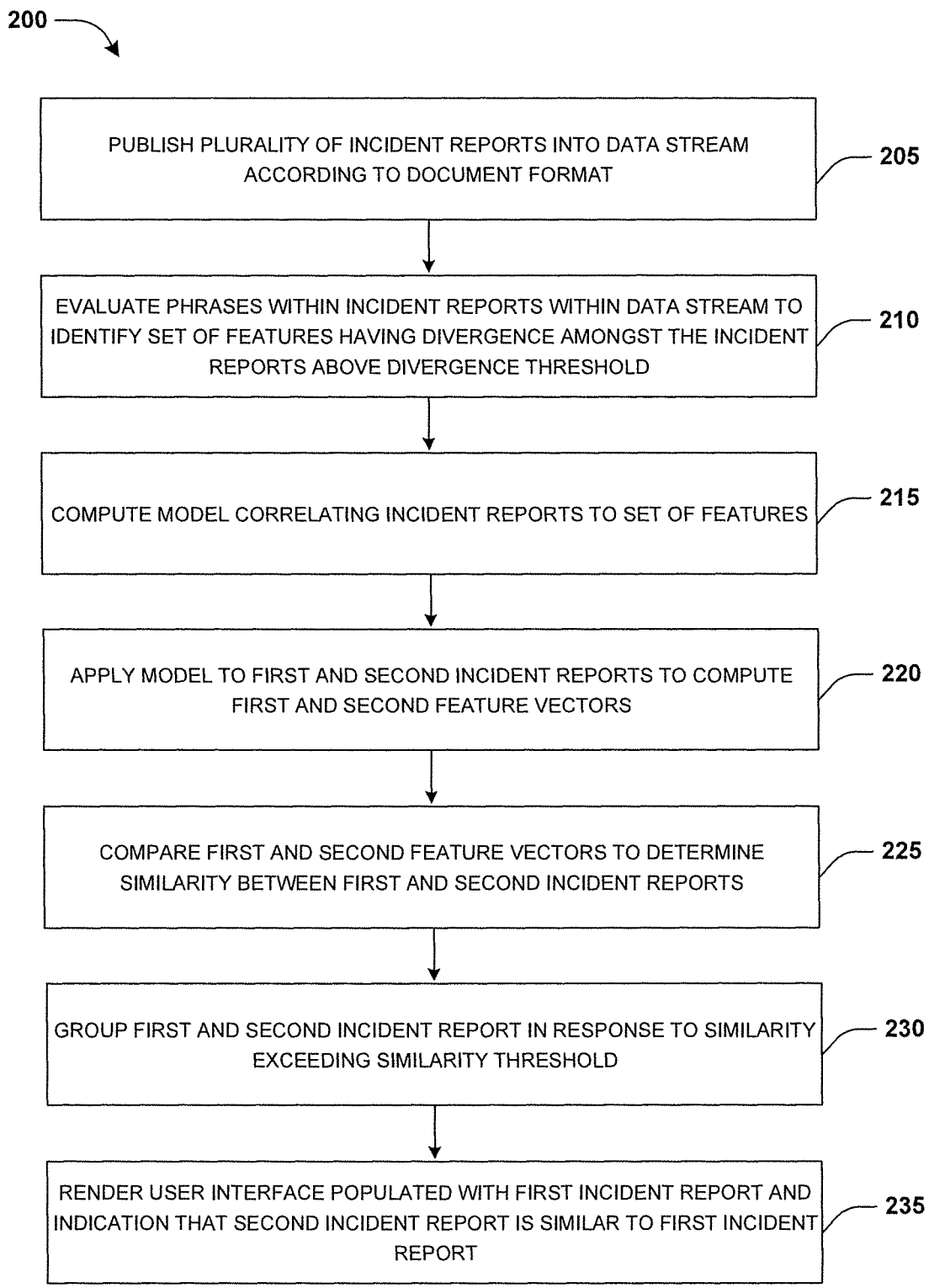
FIG. 2 illustrates an embodiment of a method associated with grouping similar incident reports.

With reference to FIG. 2, one embodiment of a computer implemented method 200 associated with grouping similar incident reports is illustrated. In one embodiment, the method 200 is performed by the incident report grouping module 105 utilizing various computing resources of the computer 815, such as the processor 820 for executing instructions associated with publishing incident reports, computing and recomputing a model, and grouping similar incident reports. Memory 835 and/or disks 855 are used for storing the model, feature vectors, incident reports, and/or other data. Network hardware is used for communicating data structures and/or other data between the computer 815 and remote computers over a network. The method 200 is triggered upon receiving incident reports from client devices.

Figure 3A:
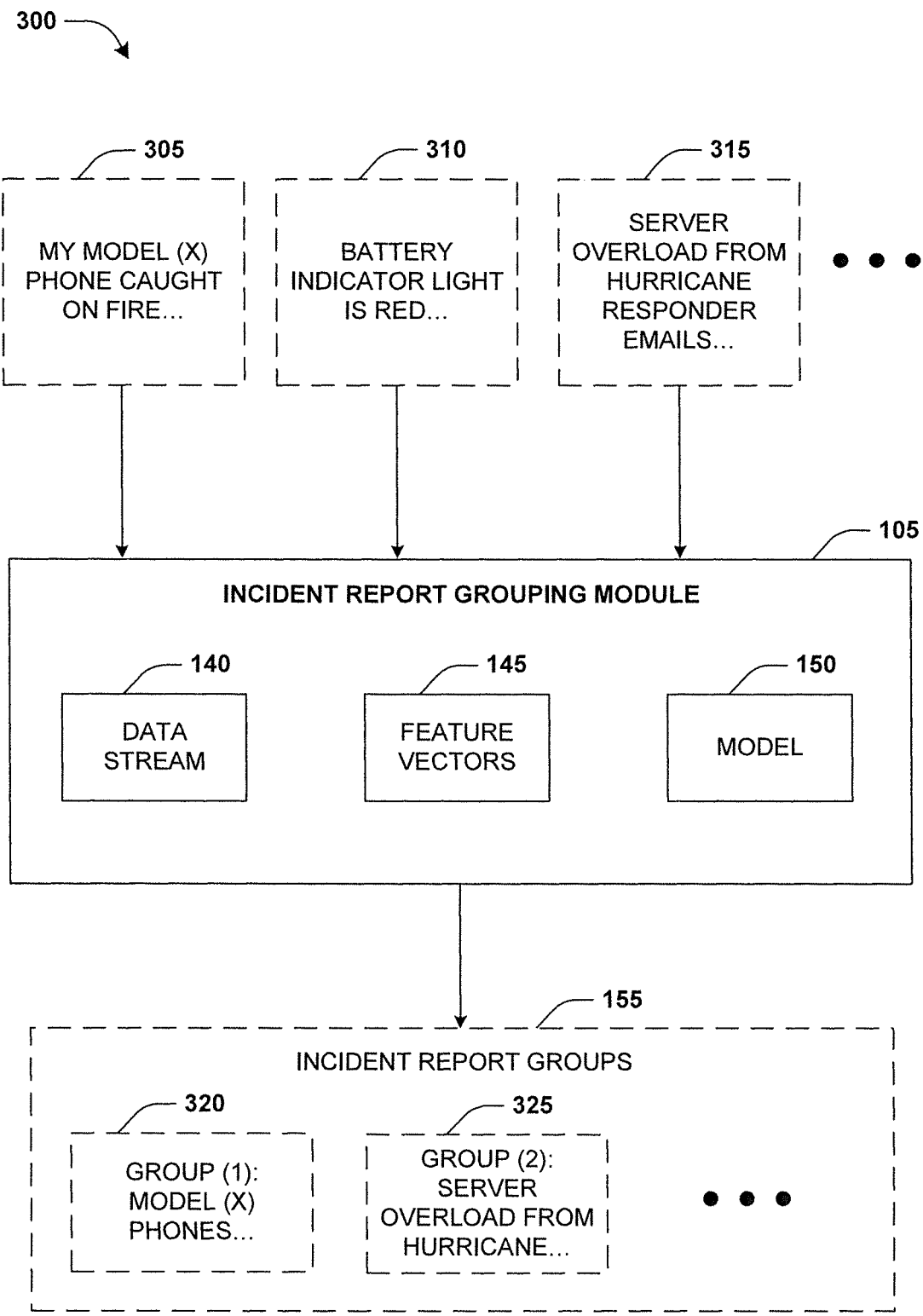
FIG. 3A illustrates an embodiment of a system associated with grouping similar incident reports, where a model is computed and used to group incident reports.

At 205, a plurality of incident reports received over a network from a plurality of client devices are published into a data stream 140 according to a document format, as illustrated by example system 300 of FIG. 3A. In one embodiment, the incident report grouping module 105 receives a first incident report 305 regarding how a model (X) phone caught on fire, a second incident report 310 regarding how a battery indicator light is red after a watch was dropped in a bathtub, a third incident report that a first responder business is experiencing server overload from receiving so many hurricane responder emails, and/or other incident reports. In one embodiment, the document format corresponds to text, json, xml, etc.

At 210, the incident report grouping module 105 evaluates phrases within the incident reports in the data stream 140 to identify a set of features having divergence amongst the incident reports above a divergence threshold. The incident report grouping module 105 performs the evaluation in response to a threshold number of incident reports being published into the data stream 140 over a time slice window. In one embodiment, the phrases "model (X)", "fire", and "hurricane" may have high divergence amongst the incident reports, and thus may be more indicative of a strong feature used to separate out and distinguish between incident reports for grouping similar incident reports. In contrast, the phrases "phone", "battery", and "light" may have low divergence amongst the incident reports, and thus may be more indicative of a weak feature that does not help separate out and distinguish between incident reports for grouping similar incident reports because such phrases occur so commonly. In one embodiment, features, such as topics, are derived from free form text using Principal Component Analysis (PCA), text feature extraction (TFIDF), support vector machine (SVM), inverted indices, etc.

At 215, a model 150 is computed to correlate incident reports to the set of features. The model 150 is populated with entries mapping feature names to pointers referencing incident report identifiers of corresponding incident reports exhibiting such features. In one embodiment, the model 150 comprises entries mapping the first incident report 305 to a model (X) feature, a fire feature, etc.

At 220, the model is applied to the incident reports, such as the plurality of incident reports and/or subsequently received incident reports, to compute feature vectors 145 for the incident reports. In one embodiment, feature vectors are created for each incident report. A feature vector of an incident report comprises entries, such as bits, having values indicating whether the incident report has such features and/or how much the incident report exhibits such features (e.g., how frequently a phrase occurs compared with other phrases). Each entry of a feature is associated with a feature score indicating a strength (e.g., divergence) of the feature. In one embodiment, features with feature scores below a threshold may be excluded when determining whether to group incident reports.

At 225, feature vectors are compared, such as by finding a cosine distance between features using a dot product of 2 feature vectors, to determine similarity between corresponding incident reports. A relatively smaller cosine distance is indicative of 2 incident reports being similar because values of entries within the feature vectors may be relatively similar. In one embodiment, similarity between incident reports is performed using an N×N computation or equivalent scheme, such as the cosine distance, a word2vec scheme, an SVM scheme, etc. to group incident reports into clusters ranked by a proximity score such as cosine distance. In one embodiment, the incident report grouping module 105 can evaluate proximity of a current feature vector of an incident report with values in the model 150 to return a list of incident reports that are similar to the incident report.

At 230, similar incident reports having similarity exceeding a similarity threshold are grouped/clustered together into incident report groups 155. In one embodiment, a first incident report group 320 comprises incident reports with features relating to model (x) phones. A second incident report group 325 comprises incident reports with features relating to server overload from the hurricane. At 235, a user interface is populated with information relating to similar incident reports, such as the incident reports within the first incident report group 320.

Figure 3B:
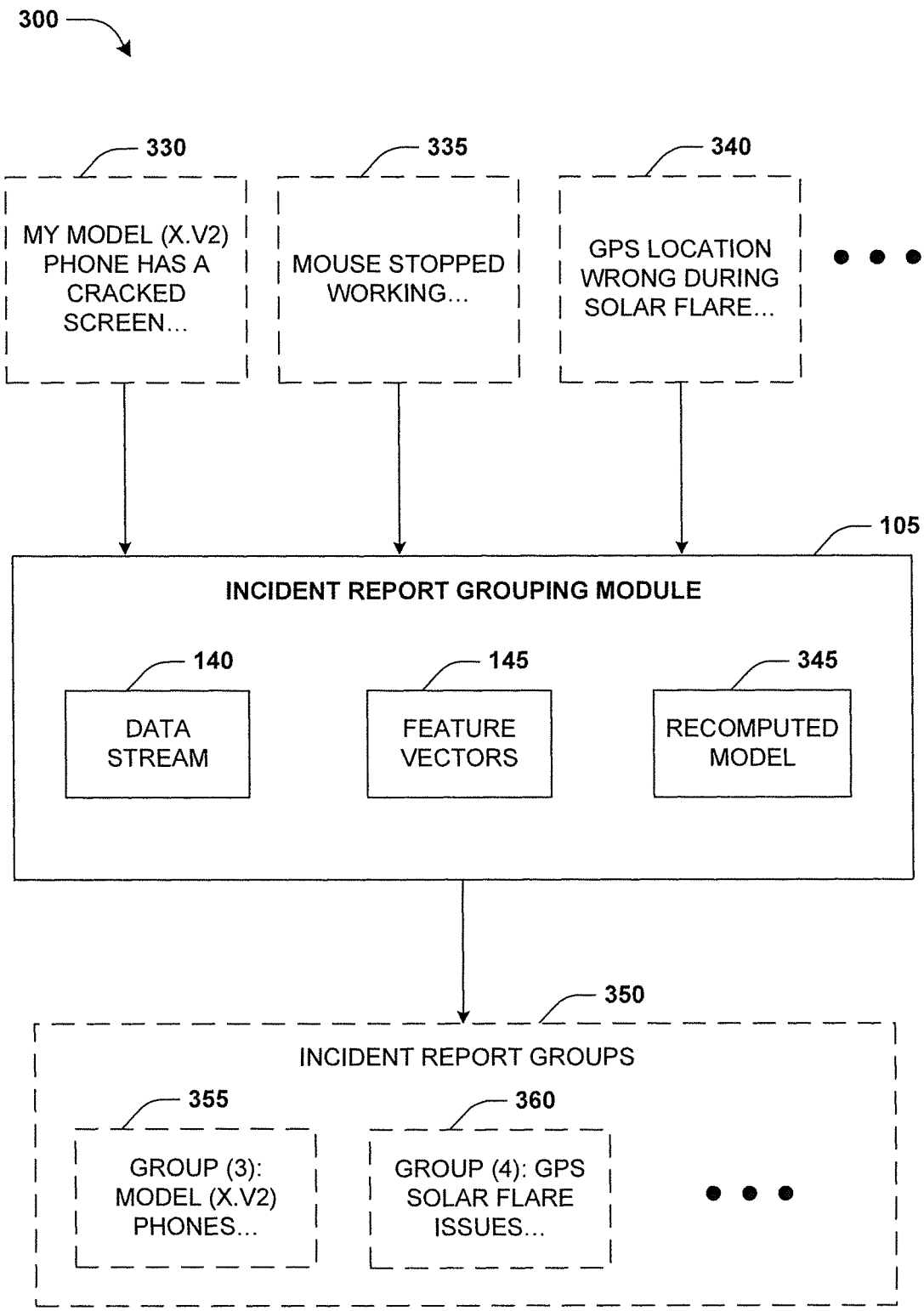
FIG. 3B illustrates an embodiment of a system associated with grouping similar incident reports, where a model is recomputed and used to group incident reports.

FIG. 3B illustrates the incident report grouping module 105 recomputing the model 150 to create a recomputed model 345. Because incident reports may relate to temporal issues, new features can emerge over time, other features can become stale, etc. For example, during a Summer Olympics, a lot of users may submit incident reports relating to the inability to access a live streaming service that streams Olympic events due to server overload. If the model 150 was computed before this event, then it may not be trained on features relating to server overload of the live streaming service because such overload rarely occurs except during inordinately high traffic events such as the Summer Olympics. Thus, it would be advantageous to recompute the model 150 based upon the new features. Similarly, these features may become stale after the Summer Olympics, and thus the recomputed model 345 could be recomputed yet again in a manner that would remove stale features.

Accordingly, the incident report grouping module 105 evaluates a second set of incident reports, such a fourth incident report 330 relating to a new model (X.V2) phone having a cracked screen, a fifth incident report 335 relating to a mouse that has stopped working, a sixth incident report 340 relating to how a GPS location is incorrect during a current solar flare, and/or other incident reports to identify a second set of features exhibited by the second set of incident reports. The second set of features is used to recompute the model 150 to create the recomputed model 345 that is now trained with new features, such as features relating to the new model (X.V2) phone, the current solar flare, etc. The second set of features may not include stale features such as features relating to the hurricane that has now passed, and thus the recomputed model 345 is not trained on such stale features.

The incident report grouping module 105 uses the recomputed model 345 to group similar incident reports into incident report groups 350. In one embodiment, the incident report grouping module 105 uses the recomputed model 345 to group similar incident reports relating to the model (X.V2) phone into a third incident report group 355. The incident report grouping module 105 uses the recomputed model 345 to group similar incident reports relating to the solar flare affecting GPS into a fourth incident report group 360.

Figure 4:
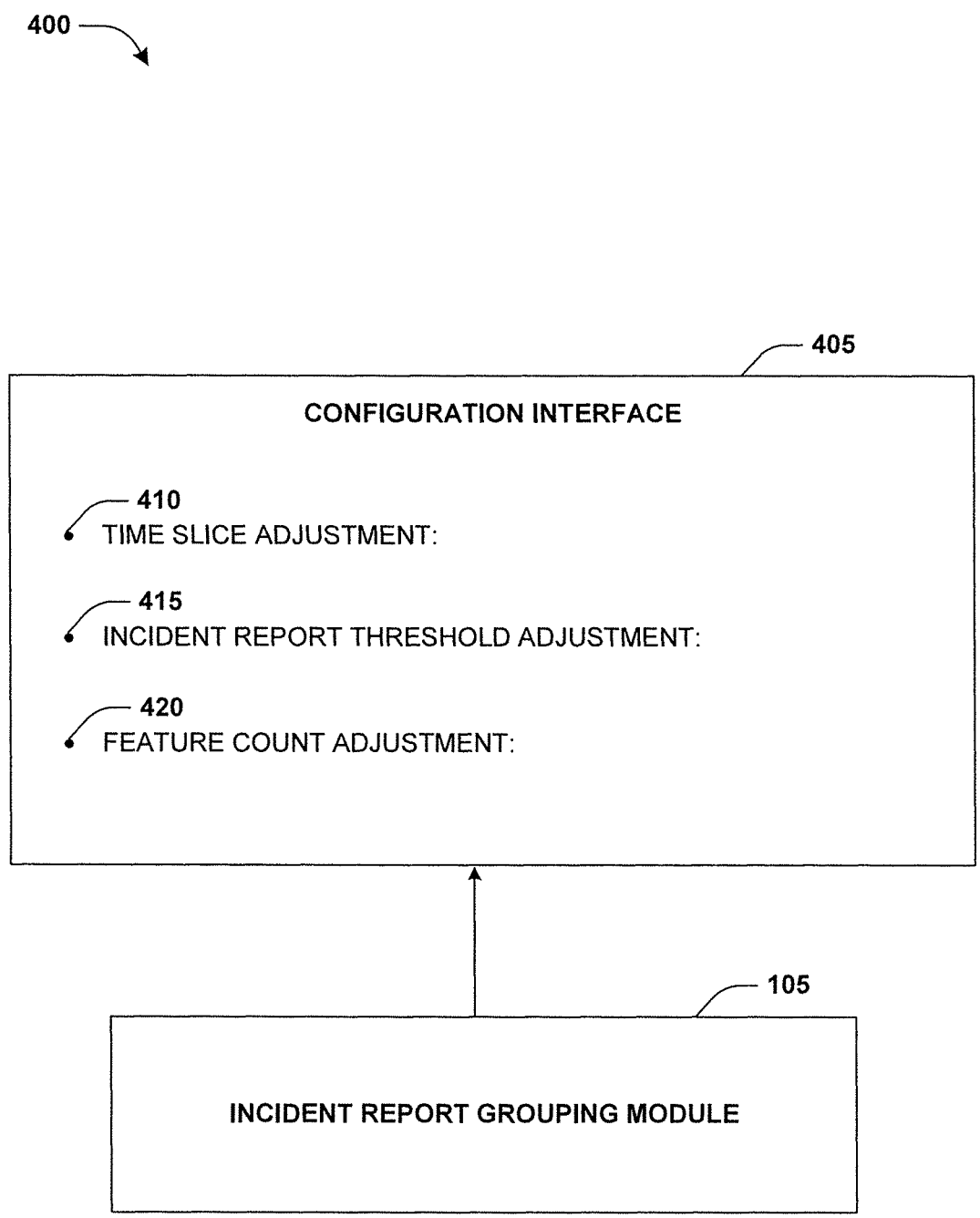
FIG. 4 illustrates an embodiment of a system associated with grouping similar incident reports, where a configuration interface is displayed.

FIG. 4 illustrates a system 400 for grouping similar incident reports. The incident report grouping module 105 is configured to render a configuration interface 405 through a display of a computing device. The configuration interface 405 is populated with a time slice adjustment interface through which a user can increase or decrease a time slice window used to trigger when the incident report grouping module 105 will identify features and compute/recompute a model for grouping similar incident reports. The configuration interface 405 is populated with an incident report threshold adjustment interface through which a user can increase or decrease an incident report count threshold used to trigger when the incident report grouping module 105 will identify features and compute/recompute a model for grouping similar incident reports. The configuration interface 405 is populated with feature count adjustment interface through which a user can increase or decrease a maximum number of features allowed to be included within a set of features and/or feature vector. In this way, input received through the configuration interface 405 is used to modify operation of the incident report grouping module 105.

Figure 5:
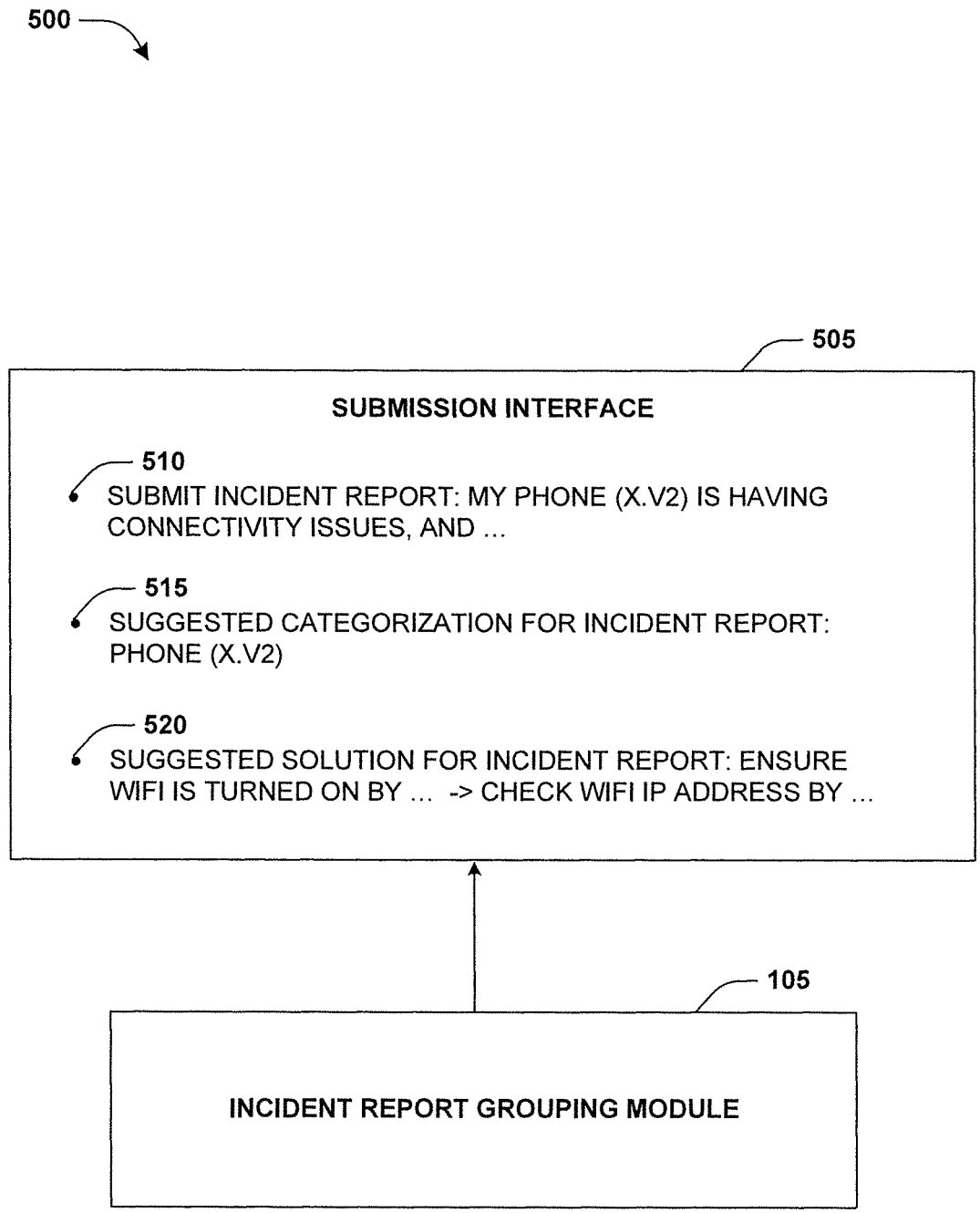
FIG. 5 illustrates an embodiment of a system associated with grouping similar incident reports, where a submission interface is displayed.

FIG. 5 illustrates a system 500 for grouping similar incident reports. The incident report grouping module 505 is configured to render a submission interface 505 through a display of a computing device. A user can access the submission interface 505 in order to submit an incident report for processing. The user may start typing a description of the incident report within an incident report submission form 510. The incident report grouping module 505 evaluates text of the description, such as in real-time while the user is typing the description, to identify features of the description, such as a phone (X.V2) feature, a connectivity issue feature, etc. The incident report grouping module 505 utilizes the model 150 to evaluate the features to identify one or more incident reports that are similar to the description. The incident report grouping module 505 can provide suggested categories 515 for the incident report being submitted by the user based upon categories (e.g., topics, features, etc.) of the similar incident reports. The incident report grouping module 505 can provide suggested solutions 520 to the user based upon prior solutions provided for the similar incident reports. In this way, the incident report grouping module 505 aids the user in more accurately categorizing the incident report and can provide relevant solutions for the user.

Figure 6:
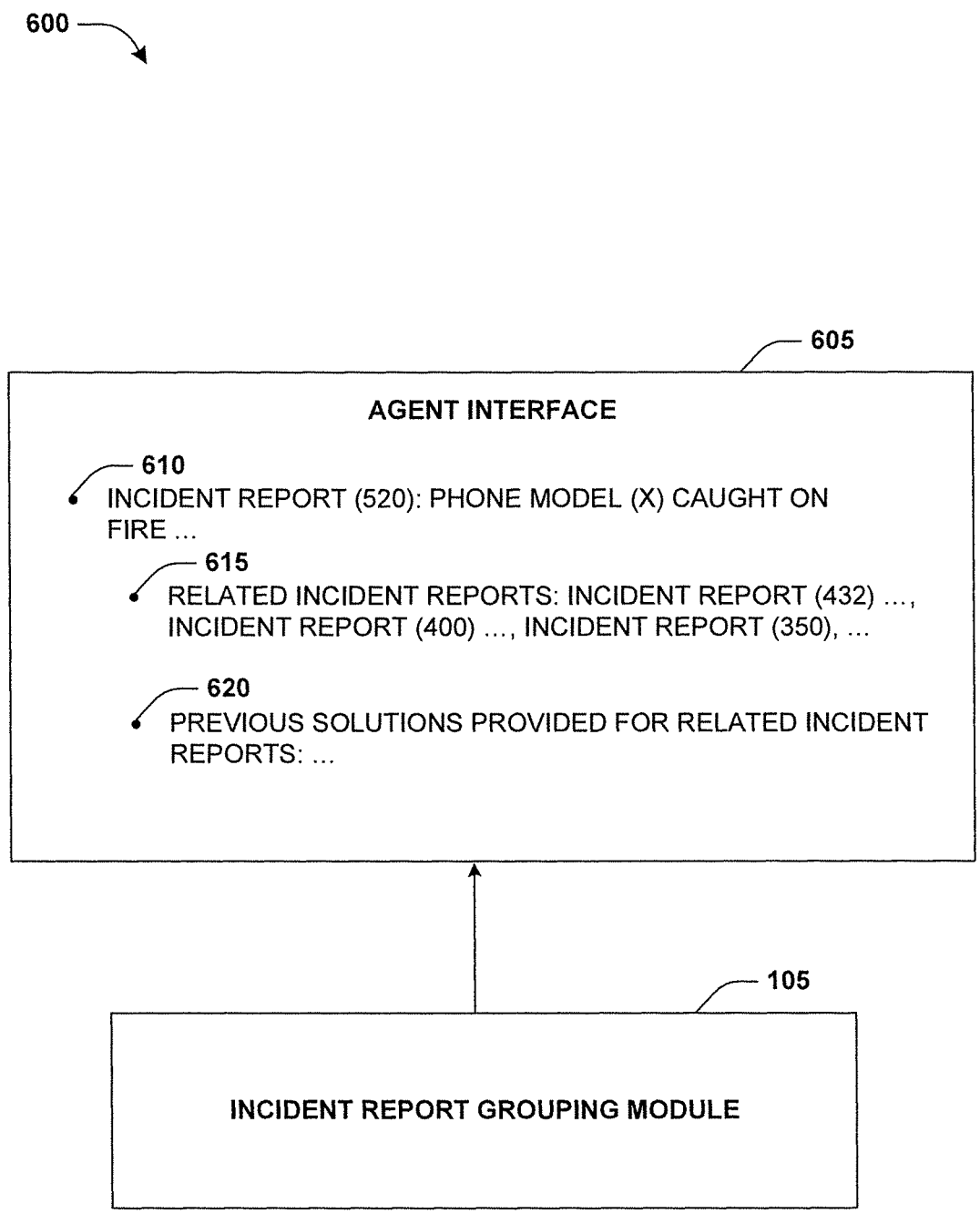
FIG. 6 illustrates an embodiment of a system associated with grouping similar incident reports, where an agent interface is displayed.

FIG. 6 illustrates a system 600 for grouping similar incident reports. The incident report grouping module 605 is configured to render an agent interface 605 through a display of a computing device. The agent interface 605 provides an agent with access to incident reports submitted by users so that the agent can work on providing solutions to the incident reports. In one embodiment, the agent has been assigned to incident report (520) 610 regarding a phone model (X) that caught on fire. The incident report grouping module 605 uses the model 150 to identify and provide information about similar incident reports, such as incident report (432), incident report (400), incident report (350), and/or other active or resolved incident reports in order to aid the agent. The incident report grouping module 105 can provide information 620 related to previous solutions provided for the similar incident reports. The incident report grouping module 605 can use the model 150 to dynamically assign groups of related incident reports to the same agent so that there is no duplicate effort by multiple agents for resolving incident reports related to the same root cause/issue. This helps reduce wasted computing resources otherwise consumed by duplicate efforts of multiple agents attempting to resolve similar incidents.

Figure 7:
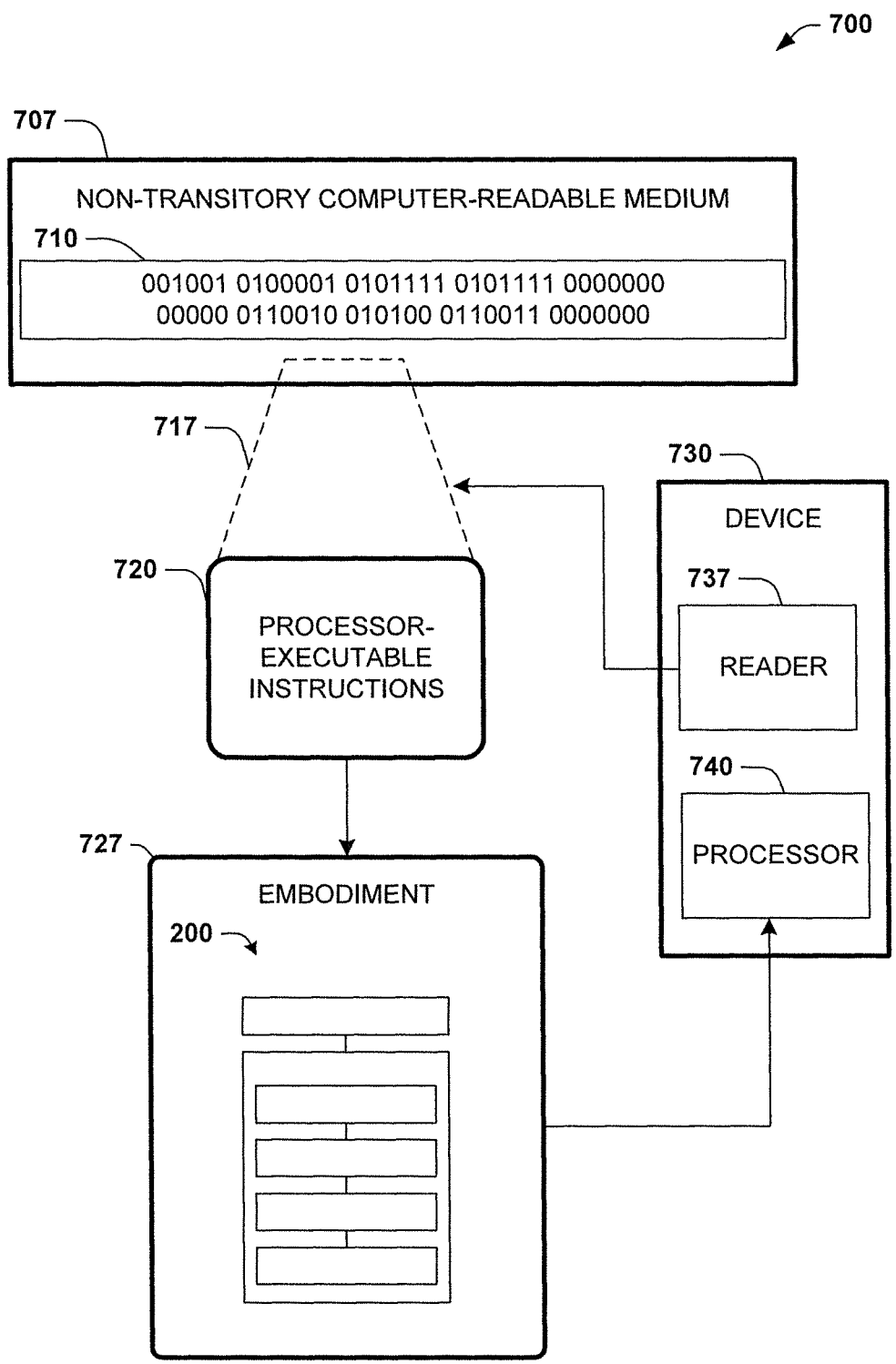
FIG. 7 illustrates an embodiment of a non-transitory computer-readable medium.

FIG. 7 is an illustration of a scenario 700 involving an example non-transitory computer-readable medium 707. In one embodiment, one or more of the components described herein are configured as program modules, such as the incident report grouping module 105, stored in the non-transitory computer-readable medium 707. The program modules are configured with stored instructions, such as processor-executable instructions 720, that when executed by at least a processor, such as processor 740, cause the computing device to perform the corresponding function(s) as described herein. In one embodiment, the, functionality of the incident report grouping module 105, stored in the non-transitory computer-readable medium 707, may be executed by the processor 740 as the processor-executable instructions 720 to perform an embodiment 727 of the method 200 of FIG. 2.

The non-transitory computer-readable medium 707 includes the processor-executable instructions 720 that when executed by a processor 740 cause performance of at least some of the provisions herein. The non-transitory computer-readable medium 707 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 707 stores computer-readable data 710 that, when subjected to reading 717 by a reader 737 of a device 730 (e.g., a read head of a hard disk drive, or a read operation invoked on a solid-state storage device), express the processor-executable instructions 720.

The non-transitory computer-readable medium 705 includes the processor-executable instructions 720 that when executed by a processor 740 cause performance of at least some of the provisions herein. The non-transitory computer-readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 705 stores computer-readable data 710 that, when subjected to reading 715 by a reader 735 of a device 730 (e.g., a read head of a hard disk drive, or a read operation invoked on a solid-state storage device), express the processor-executable instructions 720.

In some embodiments, the processor-executable instructions 720, when executed cause performance of operations, such as at least some of the example method 200 of FIG. 2, for example. In some embodiments, the processor-executable instructions 720 are configured to cause implementation of a system, such as at least some of the example system 100 of FIG. 1, for example.

Figure 8:
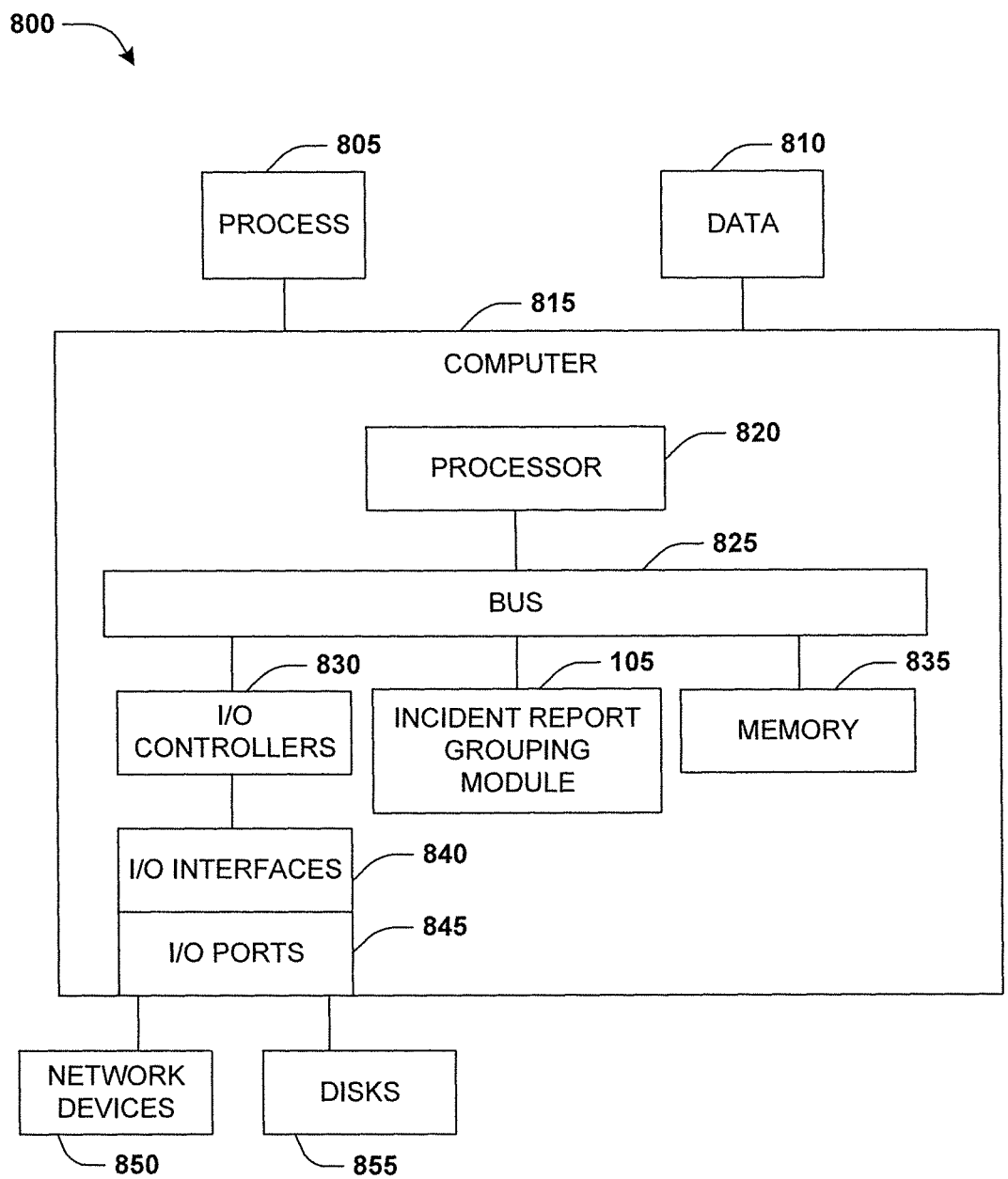
FIG. 8 illustrates an embodiment of a computing system configured with the example systems and/or methods disclosed.

FIG. 8 illustrates an example computing device 800 that is configured and/or programmed with one or more of the example systems and methods described herein, and/or equivalents. The example computing device 800 may be the computer 815 that includes a processor 820, a memory 835, and I/O ports 845 operably connected by a bus 825. In one embodiment, the, the computer 815 may include logic of the incident report grouping module 105 configured to facilitate the system 100 and/or the method 200 shown in FIGS. 1-2. In different embodiments, the logic of the incident report grouping module 105 may be implemented in hardware, a non-transitory computer-readable medium 805 with stored instructions, firmware, and/or combinations thereof. While the logic of the incident report grouping module 105 is illustrated as a hardware component attached to the bus 825, it is to be appreciated that in other embodiments, the logic of the incident report grouping module 105 could be implemented in the processor 820, stored in memory 835, or stored in disk 855.

In one embodiment, logic of the incident report grouping module 105 or the computer 815 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 815 as data 810 that are temporarily stored in memory 835 and then executed by processor 820.

The logic of the incident report grouping module 105 may also provide means (e.g., hardware, non-transitory computer-readable medium 805 that stores executable instructions, firmware) for performing rule based source sequencing for allocation.

Generally describing an example configuration of the computer 815, the processor 820 may be a variety of various processors including dual microprocessor and other multiprocessor architectures. The memory 835 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 855 may be operably connected to the computer 815 via, for example, the I/O interface 840 (e.g., card, device) and the I/O ports 845. The disks 855 may be, for example, a magnetic disk drive, a solid state disk drive, a floppy disk drive, a tape drive, a Zip drive, a flash memory card, a memory stick, and so on. Furthermore, the disks 855 may be a CD-ROM drive, a CD-R drive, a CD-RW drive, a DVD ROM, and so on. The memory 835 can store a process, such as within the non-transitory computer-readable medium 805, and/or data 810, for example. The disk 855 and/or the memory 835 can store an operating system that controls and allocates resources of the computer 815.

The computer 815 may interact with input/output (I/O) devices via the I/O interfaces 840 and the I/O ports 845. The I/O devices may be, for example, a keyboard, a microphone, a pointing and selection device, cameras, video cards, displays, the disks 855, the network devices 850, and so on. The I/O ports 845 may include, for example, serial ports, parallel ports, and USB ports. I/O controllers 830 may connect the I/O interfaces 840 to the bus 825.

The computer 815 can operate in a network environment and thus may be connected to the network devices 850 via the I/O interfaces 840, and/or the I/O ports 845. Through the network devices 850, the computer 815 may interact with a network. Through the network, the computer 815 may be logically connected to remote computers (e.g., the computer 815 may reside within a distributed computing environment to which clients may connect). Networks with which the computer 815 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

The invention claimed is:
1. A computing system, comprising:
a processor connected to memory; and
an incident report grouping module stored on a non-transitory computer readable medium and configured with instructions that when executed by the processor cause the processor to:
create a data stream from a plurality of communications received from one or more network channels, wherein the plurality of communications includes incident reports;
in response to a first threshold number of incident reports being part of the data stream over a time slice window, derive a plurality of features from the data stream from the incident reports by at least analyzing text from the incident reports;
apply a model to the features to identify and group a set of similar incident reports including identify identification data from a plurality of incident reports from the data stream that include similar features within the incident reports;
control a display to display at least the identification data for the set of incident reports that are grouped together as a group based on the similar feature associated with the plurality of incident reports;
in response to determining that a second threshold number of subsequent incident reports have been published into the data stream over a subsequent time slice window, evaluate phrases within the subsequent incident reports in the data stream to identify a second set of features having divergence amongst the subsequent incident reports above a divergence threshold;
recompute the model to correlate the incident reports to the second set of features; and apply the recomputed model to incident reports for grouping incident reports having similarities above the similarity threshold.

2. The computing system of claim 1, wherein the instructions to compute the model comprise instructions that cause the processor to:
   render a configuration interface populated with an incident count interface; and
   adjusting the first threshold number of incident reports used to trigger the identification of features and computation of the model based upon input received through the incident count interface.

3. The computing system of claim 1, wherein the instructions to compute the model comprise instructions that cause the processor to:
   render a configuration interface populated with a feature count interface; and
   adjusting a maximum number of features allowed within the plurality of features based upon input received through the feature count interface.

4. A non-transitory computer-readable medium storing computer-executable instructions that when executed by a processor of a computer causes the processor to:
   publish a plurality of incident reports received over a network from a plurality of client devices into a data stream according to a document format;
   in response to a first threshold number of incident reports being published into the data stream over a time slice window, evaluate phrases within the incident reports in the data stream to identify a set of features having divergence amongst the incident reports above a divergence threshold;
   compute a model correlating incident reports to the set of features;
   apply the model to a first incident report and a second incident report to compute a first feature vector for the first incident report and a second feature vector for the second incident report;
   compare the first feature vector and a second feature vector to determine a similarity between the first incident report and the second incident report;
   group the first incident report and the second incident report in response to the similarity exceeding a similarity threshold;
   render a user interface populated with the first incident report and an indication that the second incident report is similar to the first incident report;
   in response to determining that a second threshold number of subsequent incident reports have been published into the data stream over a subsequent time slice window, evaluate phrases within the subsequent incident reports in the data stream to identify a second set of features having divergence amongst the subsequent incident reports above the divergence threshold;
   recompute the model to correlate the incident reports to the second set of features; and
   apply the recomputed model to incident reports for grouping incident reports having similarities above the similarity threshold.

5. The non-transitory computer-readable medium of claim 4, wherein the instructions to apply the model comprise instructions to:
   assign the first incident report to one or more features within the first feature vector having feature scores above a threshold.

6. The non-transitory computer-readable medium of claim 4, wherein the instructions to apply the model comprise instructions to:
   assigning feature scores to features based at least upon divergence of the features amongst the incident reports.

7. The non-transitory computer-readable medium of claim 4, wherein the second set of features comprises a feature not comprised within the set of features.

8. The non-transitory computer-readable medium of claim 4, wherein the second set of features comprises a feature comprised within the set of features.

9. The non-transitory computer-readable medium of claim 4, wherein the set of features comprises a feature not comprised within the second set of features.

10. The non-transitory computer-readable medium of claim 4, wherein the instructions comprise instructions to:
    utilize a static feature model to assign the incident reports to static features; and
    shard the incident reports into separate data streams based upon the static features, wherein incident reports assigned to a same static feature are sharded into a same data stream.

11. The non-transitory computer-readable medium of claim 10, wherein the instructions comprise instructions to:
    compute models for each data stream based upon correlations of incident reports within each data stream to sets of features of the incident reports.

12. The non-transitory computer-readable medium of claim 11, wherein the instructions comprise instructions to:
    merge a first model with a second model based upon an overlap of a first feature set of the first model and a second feature set of the second model.

13. The non-transitory computer-readable medium of claim 4, wherein the instructions comprise instructions to:
    populate the model with entries mapping feature names to pointers referencing incident report identifiers of corresponding incident reports.

14. The non-transitory computer-readable medium of claim 4, wherein the instructions comprise instructions to:
    render a configuration interface populated with a time slice interface; and
    adjusting the time slice window used to trigger the identification of features and computation of the model based upon input received through the time slice interface.

15. A computer-implemented method, the computer-implemented method involving a computing device comprising a processor, and the computer-implemented method comprising:
    creating, by a processor, a data stream from a plurality of communications received from one or more network channels, wherein the plurality of communications includes incident reports;
    in response to a first threshold number of incident reports being part of the data stream over a time slice window of the data stream, deriving, by the processor, a plurality of features from the data stream by at least analyzing text from the incident reports;
    constructing, by the processor, feature vectors for a plurality of incident reports by at least analyzing text from the plurality of incident reports to determine whether the text corresponds to features within the plurality of features, wherein a feature vector of an incident report comprises a plurality of bits representing the plurality of features, wherein a bit representing a feature is set to either a first value to indicate that the incident report has the feature or a second value to indicate that the incident report does not have the feature;

applying a model to the features to identify and group a set of similar incident reports including determining, by processor, amounts of similar values of bits within feature vectors to group incident reports that comprise similar features, wherein a first incident report group of one or more similar incident reports is created based upon similar values of bits between the one or more similar incident reports being greater than a threshold;

controlling, by the processor, a display to render a user interface defining the first incident report group on the display of a computing device;

in response to determining that a second threshold number of subsequent incident reports have been included into the data stream over a subsequent time slice window, evaluate phrases within the subsequent incident reports in the data stream to identify a second set of features having divergence amongst the subsequent incident reports above a divergence threshold;

recompute the model to correlate the incident reports to the second set of features; and apply the recomputed model to the subsequent incident reports for grouping the subsequent incident reports having similarities above the similarity threshold.

16. The computer-implemented method of claim 15, further comprising:

wherein the model is configured to correlate the incident reports to the plurality of features;

rendering a submission user interface populated with an incident report submission form;

evaluating input submitted through the incident report submission form to identify features of the input;

utilizing the model to evaluate the features to identify an incident report similar to the features;

populating the submission user interface with information regarding the incident report.

17. The computer-implemented method of claim 16, further comprising:

populating the submission user interface with a solution provided for the incident report.

18. The computer-implemented method of claim 16, further comprising:

evaluating information related to a user that submitted the incident report to identify personal information of the user; and removing the personal information from the information before populating the submission user interface with the information.

19. The computer-implemented method of claim 16, further comprising:

evaluating the information to identify personal information related to a user accessing the submission user interface; and supplementing the information with content derived from the personal information.

* * * * *

UNITED STATES PATENT AND TRADEMARK OFFICE
CERTIFICATE OF CORRECTION

Page 1 of 1

PATENT NO. : 10,740,336 B2
APPLICATION NO. : 15/716895
DATED : August 11, 2020
INVENTOR(S) : Venkata Naga Ravi It is certified that error appears in the above-identified patent and that said Letters Patent is hereby corrected as shown below:

In the Specification

In Column 10, Lines 41-57, below "instructions 720." delete "The non-transitory computer-readable medium 705 includes the processor-executable instructions 720 that when executed by a processor 740 cause performance of at least some of the provisions herein. The non-transitory computer-readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 705 stores computer-readable data 710 that, when subjected to reading 715 by a reader 735 of a device 730 (e.g., a read head of a hard disk drive, or a read operation invoked on a solid-state storage device), express the processor-executable instructions 720.".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*